United States Patent [19]

Dougherty et al.

[11] Patent Number: 4,792,400

[45] Date of Patent: Dec. 20, 1988

[54] INSOLUBLE VINYL LACTAM CLARIFIERS

[75] Inventors: James Dougherty, N. Haledon, N.J.; Harold O. Locke, Easton, Pa.; Fulvio J. Vara, Chester, N.J.; Robert B. Login, Oakland, N.J.; Terry E. Smith, Morristown, N.J.

[73] Assignee: GAF Corporation, Wayne, N.J.

[21] Appl. No.: 23,338

[22] Filed: Mar. 9, 1987

[51] Int. Cl.[4] .................. C08F 26/10; C08J 3/28; B01D 39/16

[52] U.S. Cl. .................. 210/500.1; 210/807; 522/152; 526/264

[58] Field of Search .................. 522/152; 210/500.1, 210/807

[56] References Cited

U.S. PATENT DOCUMENTS

| | | | |
|---|---|---|---|
| 3,117,004 | 1/1964 | McFarlane | 426/442 |
| 3,216,579 | 11/1965 | Shelanski | 210/500.1 |
| 4,174,043 | 11/1979 | Salame | 428/522 |
| 4,420,395 | 12/1983 | Tanihara | 210/263 |

OTHER PUBLICATIONS

Shibata, Method of Removing Residual Vinylchloride Monomer, 5/19/78, all pages.

*Primary Examiner*—John C. Bleutge
*Assistant Examiner*—David Buttner
*Attorney, Agent, or Firm*—Marilyn J. Maue; Joshua J. Ward

[57] ABSTRACT

The invention relates to a highly filterable, water insoluble vinyl lactam polymer and to a process for improving filterability of such polymer which comprises irradiation with a source of radiant energy at a dosage sufficient to effect additional cross-linking and or saturation of the polymer.

21 Claims, No Drawings

INSOLUBLE VINYL LACTAM CLARIFIERS

In one aspect, the invention relates to a novel filterable vinyl lactam polymer in a high state of purity and in another aspect, to the process which provides improved filterability of vinyl lactam polymers.

Water insoluble normally solid vinyl lactam polymers such as polyvinyl polypyrrolidone are well known filtration aids for various substances, particularly, beer and other beverages to remove tannin type compounds and to improve beverage clarity. These polymers form insoluble complexes with polyphenolic structures of the type commonly referred to as tannins in beer, wine, vinegar and many fruit and vegetable beverages. It is the function of the vinyl lactam polymer to act as a filter aid for the colloidal stabilization of beer and in the stabilization of color values in wines, particularly white and rose wines and vinegar. While filtration of beverages using vinyl lactam polymers is very effective, problems have occurred which are primarily associated with the low flow rate index (FRI) of some polymers currently in use. This problem is aggravated when these polymers are regenerated for reuse. Additionally, traces of non-volatile water soluble components (NVWS) such as inorganics, unreacted monomer, and vinylpyrrolidone oligomers from the polyvinyl polypyrrolidone are found in the filtrate. These components are not easily removed by filtration and therefore may be objectionable.

Accordingly, it is an object of this invention to significantly improve the FRI of vinyl lactam polymer by an economical and commercially feasible process.

Another object is to provide a vinyl lactam polymer clarifying agent having a high FRI while maintaining a low NVWS level.

Another object is to increase the hardness of relatively soft water swellable polyvinyl polypyrrolidone particles.

Still another object is to provide a highly filterable vinyl lactam polymer clarifying agent.

Yet another object is to provide a filtration agent for non-comestible materials in which water solubles of the type originating in the vinyl lactam polymer are not objectionable.

These and other objects of the invention will become apparent from the following description and disclosure.

According to this invention, a particulate, normally solid, water insoluble vinyl lactam polymer having an average particle size sufficient to be retained on a filtering means is irradiated with radiant energy such as ultraviolet light, electron beam, X-rays, gammay rays or alpha particles at a dosage level of between about 0.001 and about 20 megarads, more preferably between about 0.2 and about 4 megarad. The vinyl lactam polymers of this invention are described as "popcorn" polymers* comprised of one or more vinyl lactam monomers or a vinyl lactam monomer copolymerized with a minor amount of an acrylate or methacrylate comonomer or other reactive monomer. Other suitable reactive monomers include for instance the cross-linking agents mentioned in U.S. Pat. Nos. 3,933,766 and 3,759,880. Homopolymers of this type include the polyvinyl-polypyrrolidones.

*See Advances in Chemistry Series No. 128, Published by American Chemical Society, 1973, Chapter 7, entitled "Popcorn Polymers" by J. W. Breitenbach and H. Axmann, pages 110–124.

The polyvinyl lactam homopolymers of this invention are defined by the insoluble polymers of lactam monomers having the formula

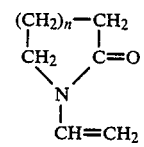

wherein n is an integer having a value of from 1 to 3. These polymeric materials can be irradiated in a dry state or as a liquid slurry.

The polyvinyl lactam, preferably polyvinyl polypyrrolidone, contains between about 0.5 and about 10% of non-crosslinked and/or unsaturated sites in the high molecular weight polymer chains. Of these, polyvinyl polypyrrolidones are most preferred. The particle size of the irradiated polymer products can vary widely. For instance, the average particle size distribution and hardness of the polymer particles should be such that they do not agglomerate or plug the pores of the filter. More specifically, when a mesh screen, for example between about 100 and about 300 mesh is employed in the clarification of beverages, the average particle distribution and hardness of the polymer particles should be such that they do not agglomerate or plug the pores of the screen. For such purposes, an average particle size greater than about 200 micrometers is conveniently employed. Conversely, when the filtering means is a membrane having small pore openings, for example between about 1 and about 10 micrometers diameter, much smaller particles of the polymer, compatible with the membrane pore size, e.g. 50 micrometers can be used. The preparation of a specific particle size of the polymer is not a serious consideration in the present invention. Vinyl lactam polymer for use in the invention can be produced in any convenient size by well known attrition methods such as grinding, ball milling, high shear mixing, sand milling, etc. The average particle size distribution of treated product is not materially altered by the present process and is generally between about 10 and about 400 mesh.

Many products are marketed commercially which satisfy the requirements for the present insoluble polyvinyl polylactam starting materials of this invention. These include POLYCLAR ®, POLYPLASDONE XL ®, and DIVERGAN R ®. Method for the preparation of these polymers are also well known. One such method is set forth in U.S. Pat. No. 2,938,017.

According to the present process, polymeric starting materials having an NVWS content above 2% can be washed with water until the solubles level is reduced to under 1%, preferably under 0.5%; or the polymer can be irradiated directly and washed with water after the stabilization treatment to reduce the solubles level when so required. In certain instances, where the NVWS level is not a consideration, as in water clarification or clarification of cosmetic, medidermal or coating solutions, water washing can be entirely eliminated. Generally, for clarification of beverages or solutions taken internally, a NVWS level of not more than 2% is required.

The washed or unwashed polymeric particles of this invention are subjected to irradiation by exposure to bombardment from a radiant energy source at a dosage level of between about 0.001 and between about 20 megarads. In the case of actinic light exposure, an incident energy level of between about 3 and about 3,000 joules/gram of polymer, preferably between about 5 and about 500 joules per gram of polymer is sufficient to increase filterability of the polymer. The exposure at these levels is effected for a period of from about 0.05 seconds to about 5 minutes. Other radiant energy sources which can be used include gamma rays, X-rays, alpha particles and electron beams, all of which employ an energy dosage level of between about 0.05 and about 20 megarads. To maintain NVWS at a reasonably low level, such as below 2%, electron beam exposures of between about 0.25 and about 3 megarads are preferred; however, when high levels of NVWS can be tolerated, dosages in the upper portion of the above range can be employed. Dosage and energy levels of gamma ray, X-ray and alpha particles are similar to those employed for the electron beam and are most preferably between about 0.2 and about 1.75 megarads when used to clarify beverages. Generally, higher dosages provide increased filterability and higher NVWS content. However, such higher dosages can be used for the filtration of noncomestible products or when washing of the polymer, either before or after irradiation is contemplated to remove NVWS to an acceptable level.

The particles, ions or rays effecting polymer irradiation are believed to impinge on the polymer particle surfaces and cause additional crosslinking and/or saturation of non-crosslinked or unsaturated sites remaining in the polymeric starting material.

The irradiation process is carried out at room temperature and atmospheric pressure or vacuum and may be effected in one or more stages with or without mixing of polymeric particles between the stages. The process may be carried out in air or in an inert atmosphere. The particles may be exposed on a tray within the focal range of the irradiating source in single or multilayers. When multilayers of particles are employed, it is recommended that irradiation be effected in a plurality of stages with mixing of the particles between stages so as to achieve a uniformly irradiated product.

For the treatment of beverages, the irradiated polymeric particles are slurried in water, poured onto a filter to form a filter cake through which the beverage is filtered. Alternatively the beverage or liquid to be clarified may be slurried with the irradiated polymer and then filtered. During this filtration process, anthrocyanogens, natural proteins, tannin protein complexes, tannis and other color or haze forming bodies are removed from the beverage with a higher degree of purity than has been achieved heretofore at such high filtration rates.

When the filtration rate falls below an acceptable level, the polymeric products are easily regenerated, eg. by washing the filter cake with caustic and then with water until the contaminant level is below about 1%. The clarifying agent is then ready for reuse. The regeneration process is usually effected at ambient temperature and pressure.

Having thus described the invention, reference is now had to the accompanying examples which are presented to illustrate preferred embodiments but which are not to be construed as limiting to the scope of the invention as more generally described above and in the appended claims.

EXAMPLES 1-6

30 g. samples of polyvinyl polypyrrolidone (PVPP) in Zip-Lock ® plastic bags were exposed to electron beam bombardment using a 3 MeV/1 mA machine such as that manufactured by the HIgh Voltage Engineering Co. (Burlington, MA). This machine is capable of delivering 1,700 Mrad/hr. Thus samples can be exposed, continuously or non-continuously, until the desired exposure is obtained. The samples in Examples 1 to 6 were exposed to 5 or 10 Mrad as indicated in TABLE I.

The resulting irradiated products were then slurried in water (4 g. polyvinyl polypyrrolidone in 200 g. water) and the resulting slurries were allowed to swell overnight after which they were deposited in a pressure filter apparatus equipped with a Schleicher & Schuell #589$^2$ filter 50 cm$^2$ in area. After about 2 minutes, the slurry formed a filter bed. In each case the filter apparatus was filled with water, 500 mls of water were filtered through and the time required for the next 100 mls of water to pass through the filter at 0.2 Bar was recorded. The flow rate index based on the reciprocal of the recorded filter time was calculated for each sample.

To determine the percent non-volatile water solubles in the polyvinyl polypyrrolidone, a 25 g. sample was slurried in 200 ml of dionized water and diluted with water to a total volume of 250 ml. After stirring for 1 hour, the polymer was allowed to settle and the supernatant was removed and filtered through a 0.45 micron membrane. 50 ml of the filtered supernatant was evaporated to dryness and weighed. The residue was one-fifth of the NVWS content in the 25 g. sample.

Product testing for FRI is effected as follows. The pressure filter apparatus for the flow rate determination consists of a stainless steel barrel (25 cm long×50 mm I.D.), filter support (50 mm stainless steel screen with 3 mm diameter holes) and outlet tube. The filter support is fitted with filter paper (Schleicher and Schuell #5892) before each analysis. The filter apparatus inlet is connected with Tygon tubing to a thermostated (20° C.±2° C.) water reservoir at a height of 200 cm from the filter support (equivalent to 0.2 bar pressure). A quantity (4.0 g. on a dry basis) of sample, swollen in 200 ml distilled water (20° C.) for 24 hours, is added to the barrel of the filter apparatus. The barrel is reassembled and filled with water. The filter bed is established by allowing 500 ml of pressurized water to pass through the apparatus. The time required for an additional 100 ml of water to pass through the filter bed is used to calculate the flow rate index.

$$FRI = \frac{4608}{\text{time (sec)}}$$

The FRI is reported in Table I along with percent NVWS.

TABLE I

| | | | Electron Beam Exposure | | |
|---|---|---|---|---|---|
| Example No. | Sample | Initial NVWS/FRI of Polyclar AT* | Electron Beam Dosage | FRI (irrad. polymer) | % NVWS in Polyclar-AT |
| 1 | Polyclar AT | 0.26/44 | 5 Megarads | 146.5 | 2.12 |
| 2 | Polyclar AT | 0.26/44 | 10 Megarads | 174.5 | 2.08 |
| 3 | Polyclar AT | 0.86/115 | 5 Megarads | 209.5 | 2.96 |

TABLE I-continued

| Example No. | Sample | Electron Beam Exposure Initial NVWS/FRI of Polyclar AT* | Electron Beam Dosage | FRI (irrad. polymer) | % NVWS in Polyclar-AT |
| --- | --- | --- | --- | --- | --- |
| 4 | Polyclar AT | 0.86/115 | 10 Megarads | 226 | 2.63 |
| 5 | Control | 0.26/44 | — | 44 | 0.26 |
| 6 | Control | 0.86/115 | — | 115 | 0.86 |

*a cross-linked, water insoluble swellable, particulate polyvinylpolypyrrolidone available from GAF Chemicals Corporation The electron beam treated PVPP samples above exhibit greatly improved flow rates and are particularly suitable as water clarification agents. For beverage clarification, water washing of the product until the % NVWS is reduced to a desired level is recommended. Alternatively, the PVPP samples could be washed prior to irradiation to compensate for the NVWS increase resulting from exposure at such dosage levels.

EXAMPLES 7-12

The procedure employed in Examples 1-6 is repeated except that gamma-ray radiation is substituted for electron beam exposure. Gamma-ray was generated by the gamma photon decay of Cobalt 60 using equipment manufactured by the Atomic Energy Co. of Canada. The 10 Mrad samples were exposed for about 1000 minutes and the 5 Mrad samples were exposed for about 500 minutes. The actual absorbed dose was determined using a Harwell dosimeter.

TABLE II

| Example No. | Sample | Gamma-Radiation Exposure Initial NVWS/FRI of Polyclar AT | Gamma-Radiation Dosage | FRI (irrad. polymer) | % NVWS in Polyclar-AT |
| --- | --- | --- | --- | --- | --- |
| 7 | Polyclar AT | 0.26/44 | 5 Megarads | 181.5 | 2.88 |
| 8 | Polyclar AT | 0.26/44 | 10 Megarads | 177.5 | 6.65 |
| 9 | Polyclar AT | 0.86/115 | 5 Megarads | 245 | 3.87 |
| 10 | Polyclar AT | 0.86/115 | 10 Megarads | 271 | 4.18 |
| 11 | Control | 0.26/44 | — | 44 | 0.26 |
| 12 | Control | 0.86/115 | — | 115 | 0.86 |

The above examples evidenced FRI considerably above those achieved with the electron beam with concomitant increase of NVWS in their filtrates.

EXAMPLES 13-17

The procedure employed in Examples 1-6 was repeated, except that electron beam dosage levels were lowered to between 0.25 and 3 megarads. The results of these experiments are reported in following Table III.

TABLE III

| Example No. | Sample | Initial NVWS/FRI | Electron Beam Exposure Dosage (Megarads) | FRI (irrad. polymer) | % NVWS in Polyclar-AT |
| --- | --- | --- | --- | --- | --- |
| 13 | Polyclar AT | 0.78/63 | 0.25 | 84 | 0.73 |
| 14 | Polyclar AT | 0.78/63 | 0.75 | 145 | 1.07 |
| 15 | Polyclar AT | 0.78/63 | 1.50 | 135 | 1.28 |
| 16 | Polyclar AT | 0.78/63 | 3.00 | 128 | 1.94 |
| 17 | Control | 0.78/63 | — | 63 | 0.78 |

The above results indicate that lower electron beam dosage levels which provide lower NVWS concentrations, should be employed for the clarification of beverages.

EXAMPLES 18-33

A ⅛ inch layer of water insoluble polyvinyl polypyrrolidone powder (30 g.) deposited on a 12×15 inch tray on a moving conveyor belt was passed under the focal point of a focused ultraviolet light source which was supplied by two 12 inch medium pressure mercury vapor lamps of 200 watts per inch. The polymer particles were exposed to an average exposure of 6 joules per pass of incident energy/gram of polymer at the focal point at 40 feet/minute. After exposure, the powder was mixed and the above exposure and mixing was repeated 2 or 9 times as indicated in Table IV. Under the testing conditions, samples were irradiated either in the atmosphere or under a blanket of nitrogen as is also indicated. The exposures under nitrogen were undertaken in order to determine whether the process of irradiation is air inhibited. No substantial air inhibition was noted.

The resulting irradiated products were then slurried in water (4 g. polyvinyl polypyrrolidone in 200 g. water) and treated as in Examples 1-6.

TABLE IV

| Example No. | Sample | Ultra-Violet Irradiation Initial NVWS/FRI | $N_2$/Air | No. of Passes at 40 ft/min | FRI (irrad. polymer) | % NVWS in Polyclar-AT |
| --- | --- | --- | --- | --- | --- | --- |
| 18 | Polyclar AT | 0.26/44 | $N_2$ | 3 | 77 | — |
| 19 | Polyclar AT | 0.26/44 | $N_2$ | 10 | 115 | 0.48 |
| 20 | Polyclar AT | 0.26/44 | Air | 3 | 77 | — |
| 21 | Polyclar AT | 0.26/44 | Air | 10 | 110 | 0.45 |
| 22 | Polyclar AT | 0.86/115 | $N_2$ | 3 | 142 | — |
| 23 | Polyclar AT | 0.86/115 | $N_2$ | 10 | 168 | 1.05 |
| 24 | Polyclar AT | 0.86/115 | Air | 3 | 132 | — |

TABLE IV-continued

| Example No. | Sample | Ultra-Violet Irradiation | | | FRI (irrad. polymer) | % NVWS in Polyclar-AT |
| | | Initial NVWS/FRI | N$_2$/Air | No. of Passes at 40 ft/min | | |
| --- | --- | --- | --- | --- | --- | --- |
| 25 | Polyclar AT | 0.86/115 | Air | 10 | 143 | 0.58 |
| 26 | Control | 0.26/44 | — | — | 44 | 0.26 |
| 27 | Control | 0.86/115 | — | — | 115 | 0.86 |
| 28 | Polyclar AT | 0.26/40 | Air | 10 | 117 | 0.64 |
| 29 | Polyclar AT | 0.34/36 | Air | 10 | 57 | 0.56 |
| 30 | Polyclar AT | —/35 | Air | 10 | 80 | 0.68 |
| 31 | Control | 0.26/40 | — | — | 40 | 0.26 |
| 32 | Control | 0.34/36 | — | — | 36 | 0.34 |
| 33 | Control | —/35 | — | — | 35 | — |

The results of these experiments on water insoluble polyvinyl polypyrrolidones establish that in each instance, the flow rate index, i.e. the filterability, was remarkably improved by a factor of about 2 regardless of their initial flow rates. This improvement was obtained without significant elevation of water solubles so that the solubles remain well below 2%.

EXAMPLES 34–36

The UV procedure described for Examples 18–33 was repeated except that samples were irradiated in air. The results of these experiments are reported in following Table V.

TABLE V

| Example No. | Sample | Ultra-Violet Irradiation | | FRI (irrad. polymer) | % NVWS in Polyclar-AT |
| | | Initial NVWS/FRI | Dosage | | |
| --- | --- | --- | --- | --- | --- |
| 34 | Polyclar AT | 0.78/63 | 3 × 120 fpm* | 75 | 0.64 |
| 35 | Polyclar AT | 0.78/63 | 3 × 40 fpm** | 93 | 0.63 |
| 36 | Control | 0.78/63 | — | 63 | 0.78 |

*equivalent to 17.9 Joules/g polymer
**equivalent to 53.7 Joules/g polymer

EXAMPLE 37

The UV procedure described in Examples 18–33 was repeated, except that DIVERGAN ®-R (vinyl pyrrolidone homopolymeric, water insoluble product of BASF) was substituted for POLYCLAR-AT. The initial NVWS/FRI of the polymer was found to be 0.30/47. After 10×40 fpm (equivalent to 1800 joules/gram of polymer) exposure to UV light the FRI was increased to 110. However, the NVWS was also increased to a small extent (0.63) but well below acceptable limits. The above results indicate that UV exposure can be used to improve the FRI of DIVERGAN ®-R.

EXAMPLE 38

The procedure described in Examples 18–33 was repeated, except that DIVERGAN ®-F (vinyl pyrrolidone homopolymeric, water insoluble product of BASF) was substituted for POLYCLAR AT. Filtration using this sample on the commercial Schleicher & Schuell #589[2] filter proved to be inoperable. Apparently the small particle size and/or the softer consistency of the DIVERGAN ®-F particles caused plugging of the filter paper within a short period of use, so that filtration of liquid ceased.

The above data indicates that any form of radiant energy exposure is capable of increasing the FRI of the vinyl lactam polymers of this invention provided that the polymer particles are of a size sufficient to be retained on the filtering means employed.

What is claimed is:

1. The process of subjecting a normally solid, water insoluble vinyl lactam polymer containing between about 0.5 and about 10% non-cross-linked and/or unsaturated sites to irradiation with radiant energy at a dosage level between about 0.05 and 20 megarads or its equivalent.

2. The process of claim 1 wherein the vinyl lactam polymer is polyvinyl polypyrrolidone and is irradiated with a source of radiant energy selected from the group consisting of ultra-violet light, electron beam, X-ray, gamma ray and alpha particles.

3. The process of claim 2 wherein the polyvinyl polypyrrolidone is irradiated at a dosage level between about 0.2 and about 4 megarads.

4. The process of claim 2 wherein the polyvinyl polypyrrolidone is irradiated with an electron beam.

5. The process of claim 4 wherein the polyvinyl polypyrrolidone is irradiated with an electron beam at a dosage level of between about 0.2 and about 4 megarads.

6. The process of claim 2 wherein the irradiation is effected with γ-rays.

7. The process of claim 6 wherein the polyvinyl polypyrrolidone is irradiated at a dosage level between about 0.2 and about 4 megarads.

8. The process of claim 2 wherein the polyvinyl polypyrrolidone is irradiated with UV light at an energy level of between about 5 and about 200 joules of incident energy per gram of polymer.

9. The product of the process of claim 2.

10. The product of the process of claim 5.

11. The product of the process of claim 7.

12. The product of the process of claim 8.

13. The product of the process of claim 3.

14. The product of the process of claim 1.

15. The product of the process of claim 2 having an FRI greater than 60.

16. The product of the process of claim 2 having a NVWS level less than 2% by weight of polymer.

17. The process of filtering a liquid through a filter bed of the irradiated polymer of claim 1.

18. The process of filtering a beverage through a filter bed of the irradiated product of claim 5.

19. The process of filtering a beverage through a filter bed of the irradiated product of claim 6.

20. The process of filtering a beverage through a filter bed of the irradiated product of claim 7.

21. The process of filtering a non-comestible liquid through a filter bed of the irradiated product of claim 2.

* * * * *